United States Patent [19]

Abdel-Khalik

[11] Patent Number: 5,045,275
[45] Date of Patent: Sep. 3, 1991

[54] GASEOUS REACTOR CONTROL SYSTEM

[75] Inventor: Said I. Abdel-Khalik, Atlanta, Ga.

[73] Assignee: The Georgia Tech Research Corporation, Atlanta, Ga.

[21] Appl. No.: 352,359

[22] Filed: May 16, 1989

[51] Int. Cl.⁵ ............................................ G21C 7/22
[52] U.S. Cl. .................................................. 376/331
[58] Field of Search ................ 376/328, 329, 330, 331

[56] References Cited

U.S. PATENT DOCUMENTS

| | | | |
|---|---|---|---|
| 3,025,228 | 3/1962 | Whitelaw | 376/331 |
| 3,212,984 | 10/1965 | Tollet et al. | 376/328 |
| 3,227,619 | 1/1966 | Plante | 376/331 |
| 3,498,879 | 3/1970 | Dastur | 376/331 |
| 3,900,365 | 8/1975 | Barclay et al. | 376/219 |
| 4,568,515 | 2/1986 | Burelbach et al. | 376/220 |

FOREIGN PATENT DOCUMENTS

| | | | |
|---|---|---|---|
| 1099762 | 8/1985 | U.S.S.R. | 376/331 |
| 453983 | 5/1986 | U.S.S.R. | 376/328 |
| 968212 | 9/1964 | United Kingdom | 376/328 |

OTHER PUBLICATIONS

"Control of Nuclear Reactors and Power Plants", M. A. Schultz, p. 215, McGraw-Hill, 1961.

Primary Examiner—Stephen C. Bentley
Attorney, Agent, or Firm—Willian Brinks Olds Hofer Gilson & Lione

[57] ABSTRACT

A reactor control system for controlling the reactivity of the core of a fission-type nuclear reactor is provided. The control system includes a reservoir containing a control gas having a high neutron cross section. At least one conduit which communicates with the reservoir to provide a fluid passage which extends at least partially into the core of the reactor. A system is provided for controlling the pressure of the control gas in the conduit.

9 Claims, 3 Drawing Sheets

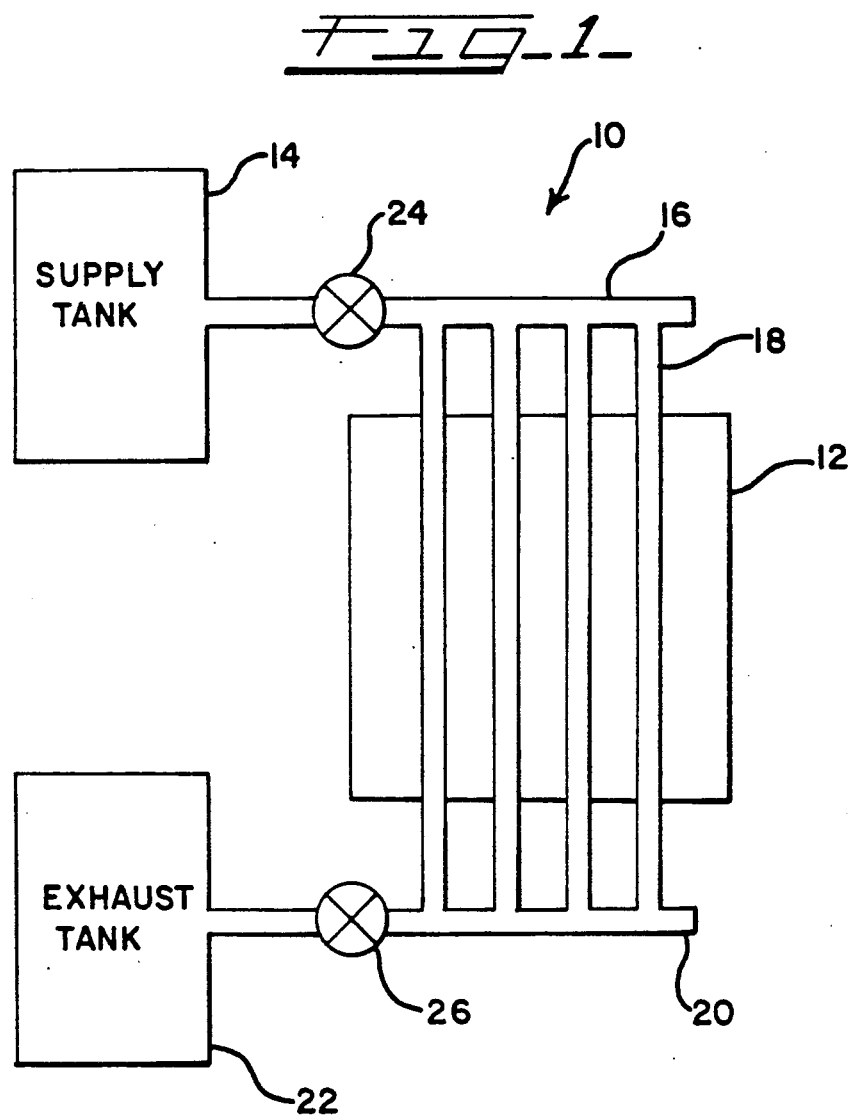

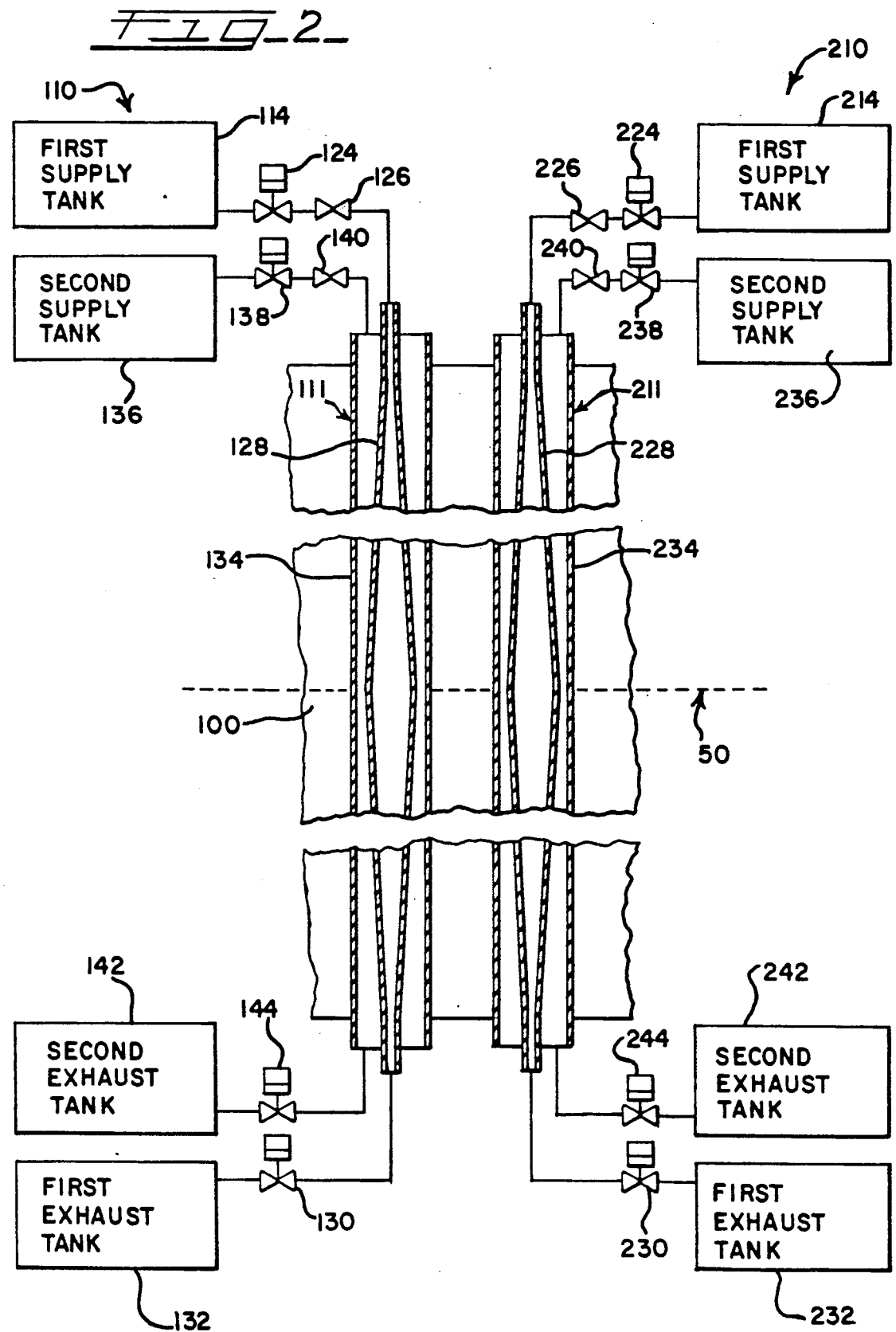

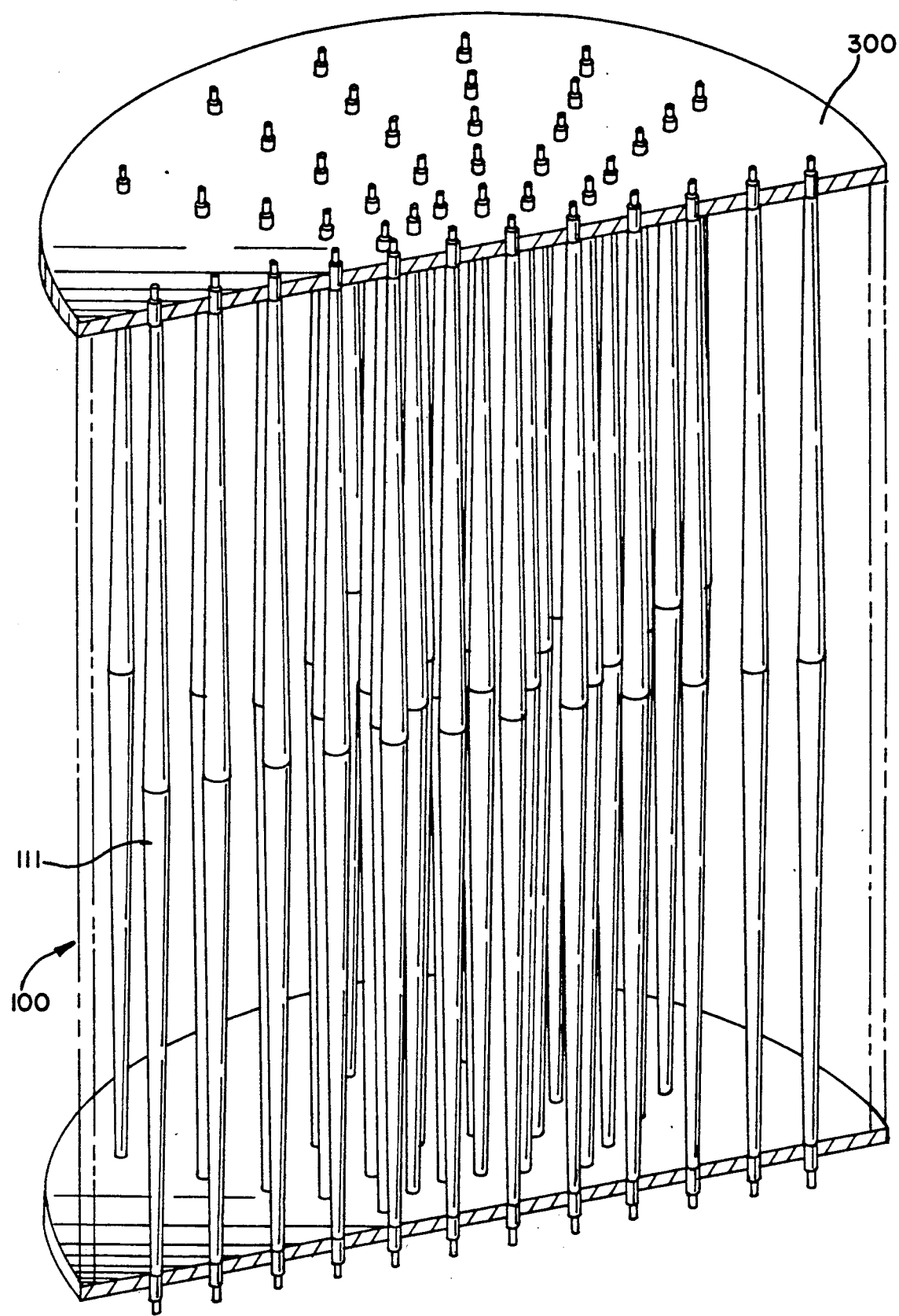

GASEOUS REACTOR CONTROL SYSTEM

BACKGROUND OF THE INVENTION

The present invention relates generally to a control system for a fission-type nuclear reactor, and more particularly to a control system for a fission-type nuclear reactor which utilizes a gas having a high neutron cross section to control the core reactivity.

A typical fission-type nuclear reactor includes a core comprised of the reactor fuel and a control system for controlling the reaction rate, or reactivity, of the reactor fuel in the core. The reactor fuel is typically an isotope of uranium, such as uranium 235, but may also comprise other suitable fuels. The reactor fuel may take the form of a fluid, such as an aqueous solution of enriched uranium, but usually the fuel is solid, either metallic uranium or a ceramic such as uranium oxide or uranium plutonium oxide. The solid fuel material is typically fabricated into various plates, pellets, pins, etc., which are clustered into an assemblage called a fuel element. These fuel elements are arranged in a matrix in the core.

The system for controlling the reactivity of the reactor core is constructed of control rods, which are also arranged in matrix form. The control rods are generally made of a neutron-absorbing material, such as boron carbide or some other neutron "poison" material. The poison material absorbs some of the neutrons emitted from the fuel elements which are necessary for sustaining the fission reaction.

The control rods are inserted and retracted into the core relative to the fuel elements to control the fission reaction rate. The fission rate in the reactor is increased by retracting the control rods from the core and decreased by inserting them into the core.

The control rods are typically inserted and retracted by an electromechanically driven mechanism, which uses a number of moving components. For example, one popular system includes a magnetically actuated control-rod drive which moves an extension of the control rod by alternatively moving one or the other of two latches. Each latch is magnetically operated by two coils. One of the coils operates to cause the latch to engage the control-rod extension and the other operates to raise the latch once it is engaged. The raising latch then raises the control rod with it. Another latch then engages, the first latch disengages, and the rod is raised by the second latch. Accordingly, through this sequence of coil actuations, the latches function in a hand-over-hand manner, retracting or inserting a control rod.

Although these electromechanical mechanisms are somewhat effective, as can be seen from the above description of their operation, their electromechanical nature requires a number of moving components which must accurately cooperate with each other. The number of moving parts presents a problem with the reliability and longevity of these systems. The reliability of the entire system depends on the reliability of the individual components.

In addition to the problems associated with the reliability and complicated nature of the control rods and associated drive mechanisms, these electromechanical control systems have other disadvantages. For example, if the control rods are only partially inserted to achieve a desired reactivity, the flux in the core will be distorted due to this partial insertion. This flux distortion results in lower power density of the core. Burnable poison rods are typically used to adjust the flux in the core.

Reactor control systems which do not use electromechanical components have also been proposed. For example, one proposed reactor control system involves the use of a liquid with a high neutron cross-section or neutron "poison". This system is commonly referred to as a chemical shim control system. The liquid passes through the coolant system channels or through dedicated tubes which are arranged throughout the reactor core. In this proposed system, the reactivity worth of the tubes is adjusted by varying the concentration of the neutron poison in each individual tube. To reduce the reactivity in a particular section of the core, the concentration of the neutron poison in the liquid in the tubes of the particular section of the core is increased. To increase the reactivity, the concentration of the neutron poison is decreased. Thus, this system allows the reactivity in each tube (or a group of tubes) to be controlled individually, providing greater accuracy in the control of the core.

Although this proposed liquid neutron poison system does not have as many moving parts as electromechanical system, it is not without disadvantages. For example, it may be difficult to quickly change the concentration of the neutron poison in the tubes. Changes in the concentration of the neutron poison may occur at a much slower rate than is desired. The time which is necessary to change the concentration reduces the response time of the reactor control system. Hence these systems are usually used in conjunction with electromechanical control rod systems.

U.S. Pat. No. 3,900,365 (Barclay et al.) discloses a reactor shut-down system which utilizes a liquid neutron poison. The system disclosed in this patent includes a plurality of tubes which communicate at one end with a reservoir containing a liquid neutron poison. The reservoir is arranged at an elevation above the reactor core providing hydrostatic pressure to bias the poison to flow into the reactor core. At the other end, the tubes are connected to a gas supply. A valve controls the gas pressure in each of the tubes. In order to shut down the reactor, the valve is used to lower the gas pressure in the tubes allowing the liquid neutron poison to flow upwardly through the tubes. The liquid neutron poison then decreases the reactivity in the core.

Although the system disclosed by Barclay et al. provides an efficient system to shut down a reactor, it does not provide a solution to the problems which are described above regarding the control of the reactivity of the core during normal operations. Changing the pressure in the tubes will either raise or lower the level of the liquid poison in the tubes. The lower part of the tube will be filled with a neutron poison, while the upper part of the tube will be filled with the gas. Therefore, use of this system to control the reactivity during normal operation of the reactor will not allow for radial flux shaping and will result in the same distorted axial flux profile problems associated with the solid control rods.

Other liquid control systems are also disclosed for example in "Control of Nuclear Reactors and Power Plants", M. A. Schultz, McGraw Hill, 1961.

Therefore in view of the above it is an object of the present invention to provide a nuclear reactor control system which is simpler than the presently used electromechanical systems.

It is another object of the present invention to provide a nuclear reactor control system which will provide the ability to shape the radial and axial flux distributions in the core.

It is still another object of the present invention to provide a nuclear reactor control system which does not require the use of chemical shim or burnable poison rods.

It is still another object of the present invention to provide a nuclear reactor control system which allows the reactivity to be precisely adjusted or controlled during normal operation of the reactor and which also permits rapid shut-down of the reactor.

It is still a further object of the present invention to provide a reactor control system which eliminates flux distortions due to partially inserted rods.

SUMMARY OF THE INVENTION

To achieve the foregoing and other objects and in accordance with the purposes of the present invention, a control system for controlling the reactivity of the core of a nuclear reactor is provided. The control system includes a control gas having a high neutron cross section and a conduit system which provides passage and confinement for the control gas within the core at a controlled pressure. The conduit system includes at least one conduit which provides a fluid passage which extends into the core and which contains a supply of the control gas. The system also includes means for controlling the pressure of the control gas in the conduit.

In a preferred embodiment the conduit extends axially through the core and the means for controlling the pressure of the control gas in the conduit comprises a valve connected to regulate the flow of the control gas between the reservoir of the control gas and the conduit.

Accordingly, with the present invention the reactivity worth of each control tube can be individually adjusted by varying the gas pressure within individual tubes. Positive or negative reactivity can be inserted into the core by decreasing or increasing the gas pressure within the control tubes, respectively.

Additional objects, advantages and novel features of the invention will be set forth in part in the description which follows, and in part will become apparent to those skilled in the art upon examination of the following description or may be learned by practice of the invention. The objects and advantages of the invention may be obtained by means of the combinations pointed out in the appended claims.

BRIEF DESCRIPTION OF THE DRAWINGS

FIG. 1 is schematic representation of a preferred embodiment of the invention.

FIG. 2 is a schematic representation of a preferred embodiment of the invention which includes concentrically disposed control tubes with a varying cross section.

FIG. 3 illustrates the control tubes illustrated in FIG. 2 disposed in a reactor core (not to scale).

DETAILED DESCRIPTION OF THE EMBODIMENTS

Referring now to the drawings and specifically to FIG. 1, a control system 10 functions to selectively increase or decrease the reactivity of the core 12 of a fission-type nuclear reactor. The control system 10 includes a reservoir of a control gas, a conduit system providing fluid passages through the core 12, and means for controlling the flow of the control gas from the reservoir to the conduits.

The reservoir comprises a supply tank 14 which contains a gas with a high neutron cross-section (a "control gas") at a high pressure. As used herein a control gas or a gas having a high neutron cross-section refers to a gas having a macroscopic thermal neutron absorption cross-section of at least $0.01$ cm.$^{-1}$ at standard temperature and pressure (STP).

The supply tank 14 communicates with at least one and preferably with a plurality of conduits or control tubes 18 which extend at least partially through the core 12. Preferably, the control tubes 18 extend completely through the core 12 and communicate with an exhaust tank 22 by means of a header 20. The control tubes 18 may be fabricated using a suitable material which has a low neutron absorption cross-section. For example, the tubes 18 may be made of aluminum for a low temperature reactor. A suitable material which may be used in a high temperature reactor is available under the trade name "ZIRCALOY".

The control gas in the supply tank is at a "high" pressure such that the control gas will flow from the supply tank 14 into control tubes 18. The pressure is regulated in the control tubes 18 by means of a valve 24. The valve 24 is operatively connected, in a manner known in the art, between the supply tank 14 and a first end of the control tubes 18. A second valve 26 is operatively connected, in a manner known in the art, between the exhaust tank 22 and the second end of the control tubes 18. Preferably, the pressure in the exhaust tank 22 is at sub-atmospheric pressure. The supply tank 14, control tubes 18, exhaust tank 22, and the valves 24, 26 define a control tube unit.

Positive or negative reactivity can be inserted into the core by using the valves 24 and 26 to regulate or control the flow of the control gas between the control tubes 18 and the supply tank 14 and the exhaust tank 22, respectively. If it is desired to decrease the reactivity, the valve 24 may be opened to allow more of the control gas from the supply tank 14 to flow into the control tubes 18. With a greater pressure in the control tube 18 the density of the control gas is greater, thereby increasing the amount of neutron absorbing material in each control tube. This results in a decrease in the reactivity of the core 12. The pressures used to increase or decrease the reactivity of the core will of course depend on the particular type of reactor. For purposes of illustration, the control gas pressure may range from 0.1–100 PSIA, to operate the reactor at its maximum power near the end of the core life and to shut-down the reactor, respectively.

In a similar fashion, if it is desired to increase the reactivity in the reactor core 12, the valve 26 may be opened permitting the control gas in the control tubes 18 to be exhausted into the exhaust tank 22, thereby lowering the pressure in the control tubes 18. The lower pressure will result in a lower density of the control gas in the control tubes 18, thereby decreasing the amount of neutron absorbing material in the control tubes 18.

The control gas may be any suitable material with a high neutron cross-section. For example, the control gas may be $He^3$ or boron hydride ($B_2H_6$). The boron hydride is preferably enriched in Boron-10 ($B^{10}$). Enriched boron hydride is preferred since it has the desired physical and neutronic properties for a control gas without the undesirable properties of $He^3$ which is not readily available. Boron hydride has a high neutron cross-section and will remain in a gaseous state over a wide range of temperatures. Boron hydride is also readily available, inexpensive, and reduces the amount of undesirable by-products. However, as will be recognized by those skilled in the art, $He^3$ and other suitable gases may be used depending on the particular use contemplated, for example, tritium production.

The control tube unit may be configured such that all of the control tubes 18 are connected to the supply tank 14 by means of a single valve 24 (as illustrated in FIG. 1) or may be connected (in a manner not illustrated in the drawings) by means of a separate valve for each control tube 18. The illustrated embodiment permits the pressure to be controlled by a single valve for a "gang" of control tubes 18, while the latter embodiment permits the pressure of each control tube 18 to be adjusted individually.

Preferably, the control system 10 includes a second control tube unit. In this preferred embodiment, the supply tank of the second control tube unit is independent of the first supply tank and the exhaust tank of the second control tube unit is independent of the first exhaust tank. This additional control tube unit provides a redundant system for safety considerations. Since the components of the first control tube unit do not communicate with the components of the second control tube unit, if a leak occurs in one of the control tube units, the other of the control tube units will remain unaffected. Thus, if a leak occurs in one of the control tube units the other one may be used to shut down the reactor.

This additional control tube unit also provides additional flexibility in controlling and fine tuning the reactivity in the core 12. For example, the pressure of the control gas in the first gang of tubes may be set at a first pressure while the control gas in the second gang of tubes may be adjusted to a second pressure. This will allow more flexibility in the control of different sections of the reactor core 12.

The control tube units may be arranged in any suitable form. For example, the control tubes from the first control tube unit may be interspersed with the control tubes from the second control tube unit throughout the core. As will be recognized by those skilled in the art more control tube units may be added to the reactor control system to shape the radial flux profile and suit a particular use.

Referring now to FIGS. 2 and 3, another preferred embodiment of the present invention is illustrated. The control system unit 110 of this embodiment includes two separate control tube units, with the tubes of one of the control tube units concentrically disposed around the tubes of the second control tube unit. The concentrically arranged tubes define a control tube unit assembly 111.

The first control tube unit includes a first supply tank 114 connected with a first or inner control tube 128 which provides a first fluid passage. An inlet control valve 124 is connected between the first supply tank 114 and the inner control tube 128. Preferably, a check valve 126 is also connected, in a manner known in the art, between the first inner control valve 124 and the inlet of the first inner control tube 128. The second end of the first inner control tube 128 is connected to a first exhaust tank 132. A first inner control tube exhaust valve 130 is operatively connected between the second end of the first inner control tube 128 and the first exhaust tank 132.

A second or outer control tube 134 is concentrically disposed around the first or inner control tube 128. Thus, a second fluid passage is defined between the outer wall of the first control tube 128 and the inner wall of the second control tube 134. A second supply tank 136 is connected to the second fluid passage. A second inlet control valve 138 is provided to control the flow and pressure of the control gas from the second supply tank 136 to the second fluid passage. Preferably a second check valve 140 is also provided between the second inlet control valve 138 and the inlet to the second fluid passage defined between the two tubes 128, 134. A second exhaust tank 142 is connected such that the control gas from the second fluid passage can be exhausted. A second exhaust valve 144 is provided to control the exhaust of the control gas from the second fluid passage to the second exhaust tank 142.

Preferably, the inner control tube 128 and the outer control tube 134 are configured to have a varying cross section. In one preferred embodiment, the cross section is such that the diameter of the tubes 128, 134 increases from the inlet of the control tubes to the core midplane 50 and then decreases from the core midplane 50 to the exit of the control tubes 128, 134. In this manner, the widest section of the control tubes 128, 134 is at the core midplane 50.

The concentrically disposed control tubes 134, 128 may also be configured such that one of the tubes 134, 128 has a variable cross-sectional area, while the other of the tubes 134, 128 has a constant cross-sectional area. In the preferred embodiment illustrated in FIG. 2, the outer control tube 134 is cylindrically shaped such that the tube 134 has a constant cross-section throughout its length. The inner control tube 128, however, has a configuration such that the diameter of the inner control tube 128 increases from the inlet to the core midplane 50 and then decreases from the core midplane 50 to the outlet end of the tube 128. This preferred configuration permits a high degree of control. By increasing the pressure in the second or outer fluid passage, the reactivity worth of the control tube unit assembly 111 can be increased at the top and bottom of the core. By increasing the pressure in the first or inner fluid passage, the reactivity worth of the control tube unit assembly 111 can be increased in the middle of the core.

Preferably each control system unit 110 is arranged such that a plurality of concentrically disposed control tube unit assemblies 111 are connected to the first supply tank 114, the second supply tank 136 and the first and second exhaust tanks 132 and 142 as described above.

For purposes of redundancy and safety, a second reactor control system unit is connected to an independent control gas reservoir system and a second independent exhaust system. The second control system unit includes at least one second control tube unit assembly 211 comprised of an inner control tube 228 and a concentrically disposed outer control tube unit 234. The second control gas reservoir system includes a first supply tank 214 and a second supply tank 236 and is connected in a manner similar to the first control system unit described above. Similarly, the exhaust system includes a first exhaust tank 232 and a second exhaust tank 242 and is connected in a manner similar to the first system described above. Since this system is connected in a manner similar to the first system described above, no further details of the connections of the second system are given here.

It will be recognized by those skilled in the art that other configurations are possible. For example, an inlet control valve and an outlet control valve may be connected to each individual tube assembly unit 111. In this manner, the pressure of each individual tube may be controlled separately, thereby providing the ability to fine tune the flux profile in different sections of the reactor core 100.

FIG. 3 illustrates a plurality of control tube units 111 arranged in a reactor core 100. For purposes of illustration, the control tube units 111 are not drawn to scale. For example, a typical reactor core 100 may have a diameter of about 12 feet, while the control tube units 111 may have an outer diameter of approximately three inches at their widest point (in the center plane 50 of the core 100). The control tube unit assemblies 111 are fixed in matrix form by means of an upper plate 300 and a lower plate 302 in a manner known in the art. The tube units may be fixed in the desired matrix form by other suitable means.

The tube unit assemblies 111 may be arranged in any suitable configuration. For example, in the illustrated embodiment, the tube unit assemblies 111 are arranged radially within the core. The tube unit assemblies 111 may be arranged such that the tubes in individual rows are connected to one control gas supply or such that every other control tube in a row is connected to a different control gas supply. As will be recognized by those skilled in the art, many other variations of the connection between the control tubes and different control gas supplies are possible.

The concentric tube arrangement provides several significant advantages. First, the pressure of the first fluid passage (the fluid passage through the inner control tube 128) is controlled independently of the pressure in the second fluid passage (the fluid passage through the annular region between the two tubes 128, 134). This arrangement permits the axial flux profile and reactivity in the core to be controlled more precisely. The pressure of the control gas in the fluid passage in the inner control tube 128 may be fixed at a first pressure and the pressure in the second fluid passage may be adjusted to a second pressure.

Second, this concentric tube arrangement provides redundancy and safety for the reactor control system. If the control gas leaks from the first inner control tube 128, the gas will leak into the annular region between the two tubes (the second fluid passage). Thus, the leak will pose no danger to the system. On the other hand, if there is a failure in the outer tube 134 and the control gas in the annular region leaks into the core, the pressure in the first inner control tube 128 may be adjusted to control and/or shut down the reactor core 100.

The embodiment with two separate control system units 110 and 210 provides even greater redundancy and safety. The first and second control system units 110 and 210 operate independently of each other and thus a failure of one of the systems will not affect the other of the systems. Accordingly, if one system fails the other may be used to control and/or shut down the reactor.

It will be recognized by those skilled in the art, that if desired, other suitable safety or shut-down systems may be used in conjunction with the gaseous control system of the present invention. For example, a reservoir of a liquid having a high neutron cross-section may be incorporated to communicate with the conduits which are filled with the control gas during normal operation. In this manner if there is a loss in pressure in the control gas system, the high neutron cross-section liquid may be run through the conduits to shut down the reactor.

It will also be recognized that the control tubes may have any suitable orientation in the reactor. The embodiments illustrated in the drawings include control tubes arranged in a vertical position. The control tubes, however, may be arranged horizontally or at an angle.

In summary, the reactor control system of the present invention provides a system which may be safely used to control the reactivity of a reactor core. Flux shaping can be accomplished more advantageously, simplifying the design of the reactor core and allowing for more uniform burn-up of the fuel. The need for "burnable" poison rods is eliminated. The reactivity of the core can be easily decreased or increased by increasing or decreasing the gas pressure within the control tubes, respectively. By adjusting the reactivity worth of particular control tubes, and/or the number of tubes in various regions of the core, flux shaping and reactivity control can be accomplished. Reactivity changes due to variations in operating conditions, as well as long-term reactivity changes due to fuel depletion, and fission product accumulation can be compensated for by varying the gas pressure, i.e. the worth of the control tubes.

Since the entire control tube is filled with the neutron absorbing gas, flux distortions due to partially inserted rods are eliminated allowing for higher power densities of the core. Further, the flux profile of the core can be flattened by adjusting the worth of various control tubes within the reactor core and/or varying the number of control tubes in different regions of the core. The control tubes may be shaped such that the axial flux profile in the core is depressed in the middle of the core by having the control tubes have the widest diameter at that section of the core. The concentric tube arrangement allows greater flexibility in shaping the axial flux profile at various burn-up levels since the gas pressures in the two fluid passages can be independently adjusted. This, together with the fact that the cross sectional areas of both tubes vary along their length, allows the differential reactivity worth along the tubes to be adjusted.

The gaseous control system eliminates the need for conventional control rods and the associated electromechanical drive systems. The system makes it possible to use single enrichment fuel loading. The system also advantageously increases the reactor cycle time and average power density.

The foregoing description of the preferred embodiments of the present invention has been presented for purposes of illustration and description. The above disclosed embodiments are not intended to be exhaustive or to limit the invention to the precise forms disclosed, and obviously many modifications and variations are possible in view of the above teachings. The embodiments were chosen and described in order to best explain the principles of the invention and its practical applications. It is intended that the scope of the invention be defined by the following claims, including all equivalents.

I claim:

1. A nuclear reactor control system for controlling the reactivity of the core of a nuclear reactor comprising:

a control gas having a high neutron cross-section;
a first tank containing a first supply of the control gas;

a first conduit providing a first fluid passage extending into the core, the first conduit being operatively connected to communicate with the first tank;

a first valve operatively connected to regulate the flow of the control gas between the first tank and the first conduit;

a second conduit concentrically disposed around the first conduit such that a second fluid passage is defined between the outer surface of the first conduit and the inner surface of the second conduit;

a second tank containing a second supply of the control gas, the second tank being operatively connected to communicate with the second fluid passage;

a second supply valve operatively connected to regulate the flow of the control gas between the second tank and the second fluid passage;

a first exhaust tank and a first exhaust valve, the first exhaust valve operatively connected to control the flow of the control gas between the first fluid passage and the first exhaust tank, and, hence, the gas pressure in the first fluid passage; and a second exhaust tank and a second exhaust valve, the second exhaust valve operatively connected to control the flow of the control gas between the second fluid passage and the second exhaust tank.

2. The reactor control system of claim 1 wherein the control gas is selected from a group consisting of $He^3$ and boron hydride ($B_2H_6$).

3. The reactor control system of claim 2 wherein the boron hydride is enriched in $B^{10}$.

4. The reactor control system of claim 1 wherein the control gas includes a macroscopic thermal neutron absorption cross-section of at least 0.01 $cm^{-1}$ at standard temperature and pressure (STP).

5. The reactor control system of claim 1 wherein the first and second concentrically disposed conduits comprise an assembly, and the reactor control system further comprises a plurality of such assemblies to provide a plurality of fluid passages extending into the core.

6. The reactor control system of claim 1 wherein:

a plurality of conduits and supply valves are operatively connected to communicate with the first tank defining a first gang of conduits; and a plurality of conduits and supply valves are operatively connected to communicate with the second tank defining a second gang of conduits.

7. The reactor control system of claim 6 wherein the conduits in the first and second gangs are arranged in the core such that the conduits in the first gang are interspersed with the conduits in the second gang.

8. The reactor control system of claim 1 further comprising:

a third tank containing a supply of the control gas;

a third conduit providing a fluid passage extending into the core, the conduit being operatively connected to communicate with the third tank;

a third supply valve operatively connected to regulate the flow of the control gas between the third tank and the third conduit;

a fourth conduit concentrically disposed around the third conduit such that a fourth fluid passage is defined between the outer surface of the third conduit and the inner surface of the fourth conduit;

a fourth tank containing a fourth supply of the control gas, the fourth tank being operatively connected to communicate with the fourth fluid passage; and a fourth supply valve operatively connected to regulate the flow of the control gas between the fourth tank and the fourth fluid passage.

9. The reactor control system of claim 8 further comprising:

a third exhaust tank and a third exhaust valve operatively connected to control the flow of the control gas between the third fluid passage and the third exhaust tank; and a fourth exhaust tank and a fourth exhaust valve operatively connected to control the flow of the control gas between the fourth fluid passage and the fourth exhaust tank.

* * * * *